United States Patent [19]
Guarino

[11] 4,093,539
[45] June 6, 1978

[54] ACTIVATED SLUDGE TREATMENT OF WASTEWATER

[75] Inventor: Carmen F. Guarino, Philadelphia, Pa.

[73] Assignee: Autotrol Corporation, Milwaukee, Wis.

[21] Appl. No.: 685,723

[22] Filed: May 12, 1976

[51] Int. Cl.$^2$ .................. C02C 1/06; C02C 1/10; B01D 21/02
[52] U.S. Cl. .................. 210/17; 210/150; 210/151
[58] Field of Search .................. 210/17, 150, 151

[56] References Cited

U.S. PATENT DOCUMENTS

| | | | |
|---|---|---|---|
| 3,703,238 | 11/1972 | Torpey | 210/151 |
| 3,704,783 | 12/1972 | Antonie | 210/17 X |
| 3,744,634 | 7/1973 | Schlenz | 210/151 |
| 3,839,198 | 10/1974 | Shelef | 210/17 X |
| 3,886,074 | 5/1975 | Prosser | 210/150 |

Primary Examiner—Sidney Marantz
Attorney, Agent, or Firm—Quarles & Brady

[57] ABSTRACT

A method for operating an activated sludge wastewater treatment plant which utilizes rotating contactors that are partially submerged in the wastewater in the aeration tank of the activated sludge plant. The rotating contactors provide a fixed film media for the growth of biological life that is present in the recycled activated sludge in the aeration tank. The result is a more active biological coating on the fixed film media than is found on such media when used as a separate secondary treatment. In the preferred embodiment, the energy to rotate the contactors is supplied by the same compressed gas that is normally introduced below the surface of the wastewater in the aeration tank of the conventional activated sludge system.

2 Claims, 3 Drawing Figures

ACTIVATED SLUDGE TREATMENT OF WASTEWATER

BACKGROUND OF THE INVENTION

This invention relates to the biological treatment of wastewater and provides a method and apparatus for both the rapid upgrading in efficiency of existing activated sludge wastewater treatment plants and for the design of new and more efficient activated sludge treatment plants. More specifically, the invention is concerned with utilizing a rotatable, partially submerged contacter in the aeration tank of an activated sludge wastewater treatment plant.

At the present time, wastewater treatment plants commonly utilize one or more processes for the treatment of wastewater. The most widely used watewater treatment process is that of "primary treatment" which relies on the plain sedimentation of settleable wastewater solids for biochemical oxygen demand BOD and suspended solids removal. The efficiency of the primary process is in the 25-30% range. However, the results of primary treatment can be improved by the use of chemicals to enhance the settleability of wastewater solids.

In addition to the primary treatment process, there are a number of "secondary treatment" processes employed. These processes improve water quality by employing the growth of biological masses which utilize the pollutants in the water for nutrients in their metabolic life cycles. The subsequent removal of the biological masses from the wastewater results in an effluent of an improved quality.

The "trickling filter" treatment is one secondary technique widely used in the treatment of wastewater. The filter is a packed bed of media which provides a surface upon which a film of biological slime can grow and over which the wastewater is passed. The oxygen and organic matter in the wastewater diffuses into the film where the oxidation and synthesis of additional growth can occur. Plants using the trickling filter method can effect a carbonaceous BOD removal of 60 to 90 percent, depending mainly on the loading rate of the facility. In addition, the trickling filter process can effect an oxidation of the ammonia which is present in the wastewater which is desirable.

The other and probably most widely used secondary treatment for wastewater is the "activated sludge" process. The activated sludge process can be defined as a process in which flocculated biological growths are continuously circulated and contacted with organic wastewater in the presence of oxygen. The oxygen is usually supplied by bubbling air into the sludge-liquid mixture in an aeration tank. This air can be introduced through air diffusers to develop a hydraulic motion of the contents of the aeration tank. A typical hydraulic motion involves a "spiral roll" of the contents of the aeration tank. The aeration step is usually followed by a solids-liquid separation, from which a portion of the biologically active sludge is separated and recycled back to the aeration tank to provide an active source of bacterial growth to continue treatment.

The activated sludge process under optimum conditions can be up to 90% effective in the removal of carbonaceous BOD; it can also be effective to oxidize the ammonia present. However, the "activated sludge" process is not without disadvantages as it can be readily upset by surges in the volume of wastewater and other circumstances which may prevent the attainment of the designed goals.

In recent years, another wastewater treatment technique has become popular which employs "rotating film" contactors also known as rotating biological contactors. Generally, the fixed film contactors are comprised of a plurality of plastic discs which are relatively densely packed but spaced apart to form cylinders. The surfaces of the discs provide the media upon which bacteria and other simple life forms can attach and grow. Unlike the filter beds of the trickling filter, the discs are only partially submerged in the wastewater and can be rotated to provide a continuous supply of nutrients and oxygen to the microorganisms. The shearing forces exerted on the organisms during rotation through the wastewater cause excessive growth to slough from the media into the mixed liquor. The rotation of the contactors provides a mixing action which keeps the biomass in suspension, and the wastewater flow carries the solids out of the system for subsequent clarification.

The rotating fixed film process differs from the trickling filter process in that it has a dynamic, rather than a stationary media and the media is exposed to more wastewater. And, it differs from the activated sludge process by having an attached, rather than a suspended biomass. In addition, the rotating fixed film process achieves higher levels of treatment than those obtained with the trickling filter method. It also possesses an advantage over the activated sludge process in that it has less susceptibility to upset from the changes in hydraulic or organic loadings.

Among the patents that have issued relating to the rotating fixed film process and the Torpey U.S. Pat. No. 3,575,849 which discloses the use of forcibly rotated contactors in secondary sedimentation tanks, but also mentions that forcibly rotated contactors could be used in the aeration tank of an activated sludge wastewater treatment plant, and the Prosser U.S. Pat. No. 3,886,074 which discloses the use of air driven rotating contactors.

SUMMARY OF THE INVENTION

The present invention relates to a method of improving the efficiency of an "activated sludge" wastewater treatment plant which comprises partially submerging a rotating biological contactor in the aeration tank of an activated sludge plant and, where available, utilizing the hydraulic motion present in said tank to rotate the contactor in the wastewater containing recycled sludge to obtain a biomass on said media which contains the microorganisms which are normally present in the recycled activated sludge, in addition, to the organisms which normally constitute the biomass found on a rotating biological contactor. In "activated sludge" systems not employing the hydraulic motion of the wastewater, a supplemental air source can be used to rotate the contactors.

It is a further object of the invention to provide a method and apparatus for upgrading the efficiency of an existing activated sludge plant to in excess of 90% without significantly adding to the energy cost of operating said plant.

It is another object of this invention to provide a method of minimizing the detrimental effects upon the operating efficiency of an activated sludge treatment plant which can result from hydraulic surges by maintaining a large resident biomass upon rotating biological contactors positioned in the aeration tank.

It is a further object to disclose a method which uses the existing energy present in the aeration tank of an activated sludge treatment plant to rotate a biological contactor and to remove BOD from the watewater being treated.

It is a still further object to provide a biomass in the aeration tank of an activated sludge treatment plant which is superior to that which one would normally find in the aeration tank because it contains organisms which may not normally be present in recycled activated sludge.

It is a still further object to provide a method and apparatus for modifying and constructing wastewater treatment plants which will allow such plants to use less land area than would be required for plants using the activated sludge and rotating fixed film contactor treatments in series or in parallel.

The foregoing and other object and advantages of this invention will appear in the following detailed description of the preferred embodiments of the invention.

DESCRIPTION OF THE PREFERRED EMBODIMENTS

Figure 1:
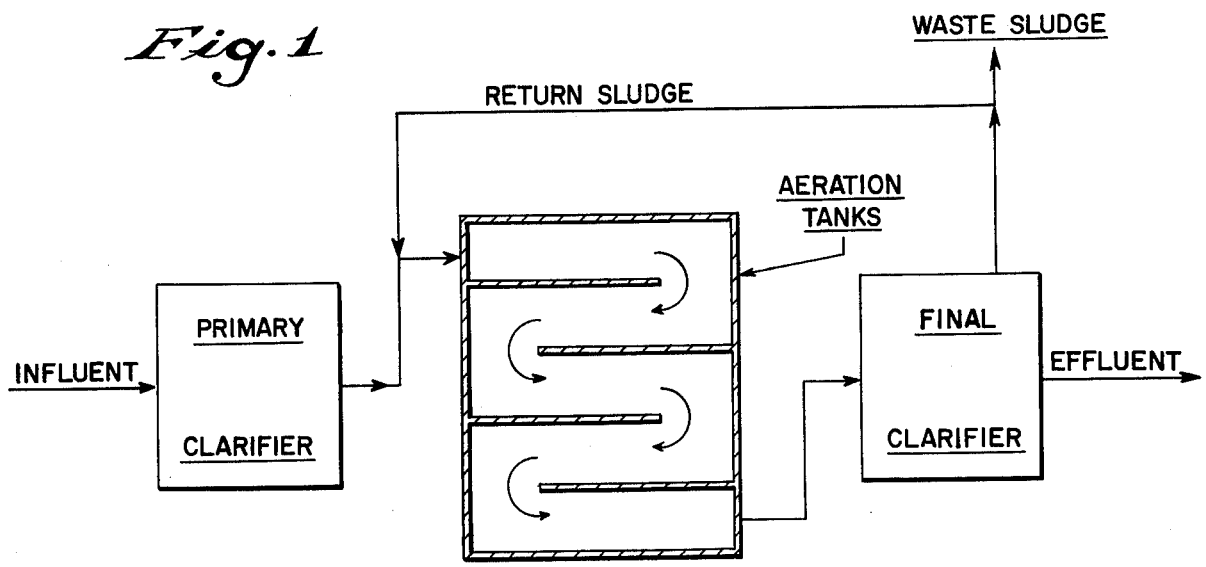
FIG. 1 is a flow diagram of a conventional activated sludge plant for domestic sewage.

The flow diagram of a conventional activated sludge wastewater treatment plant for domestic sewage using the conventional diffused air system of aeration is shown in FIG. 1. Variations on the conventional activated sludge configuration which meet the treatment needs of a particular wastewater strength include, but are not limited to, the complete-mix, step-aeration, modified aeration, contact stabilization, kraus, high-rate aeration, and pure-oxygen systems. These modifications will also benefit from the concept disclosed. The following discussion on the conventional activated sludge treatment plant should be considered generally representative of each system's behavior.

The influent or untreated sewage is introduced into the primary clarifier where the plain sedimentation of settleable wastewater solids for biochemical oxygen demand and suspended solids removal occurs. The primary clarification can be improved with the addition of chemicals to enhance the settleability of wastewater solids.

As seen in FIG. 1, the sewage leaves the primary clarifier and enters the aeration tanks. At the head of the aeration tank all of the entering sewage is mixed with the returned activated sludge. With average domestic sewage, the volume of returned sludge is normally 20 to 30 percent of the volume of sewage to be treated. The activated sludge is returned at a rate to maintain a solid content in the mixed liquor of the aeration tank of 1,000 to 2,500 ppm. Since in the activated sludge process the environment is the sewage itself, the efficient operation of the process is dependent upon the continual maintenance of dissolved oxygen at all times throughout the sewage being treated. However, the environment itself accomplishes little unless it is inhabited by enough living workers, i.e., microorganisms, fungi, and the like. In the aeration tanks of the activated sludge plant the flocculated biological growths are continuously circulated and contacted with organic wastewater in the presence of oxygen.

Figure 2:
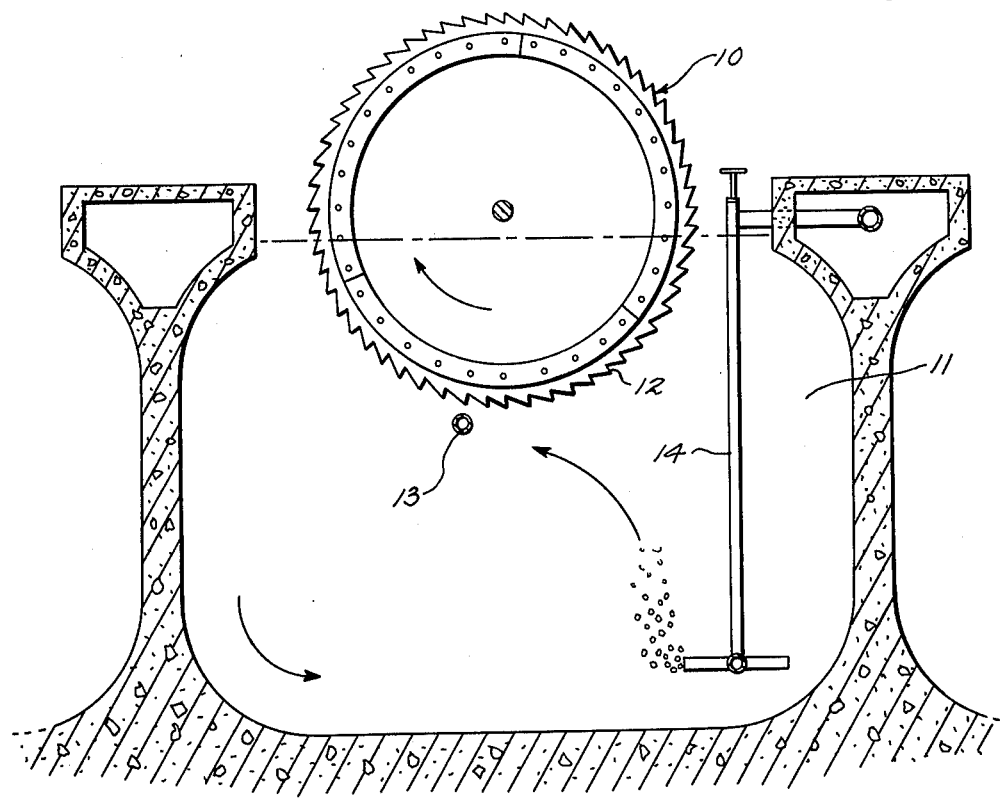
FIG. 2 is a diagrammatic cross-sectional view of a portion of an aeration tank of an activated sludge treatment plant incorporating the invention.

The oxygen is usually supplied by bubbling air into the sludge liquid mixture through air diffusers as seen in FIG. 2.

Air is normally applied below the surface of the aeration tanks at the rate of 1 – 1½ cubic feet per gallon of sewage or 900 – 1100 cubic feet per pound of biochemical oxygen demand (BOD) to be removed.

During the aeration step three major reactions occur. First, there is a rapid adsorption and flocculation of suspended colloidal and soluble organics by the suspended biomass; second, there is a progressive oxidation and synthesis of the adsorbed organics with the result that organics are continuously removed from the solution; and third, continued aeration results in oxidation and dispersion of the sludge particles. From the aeration tanks the treated sewage flows to a final clarifier where a separation of the solids from the liquids occurs. The sludge which is biologically active is separated and recycled back to the head of the aeration step.

The flow diagram for a modified aeration process is identical with that of the conventional aeration process. The biological difference between the two systems being that the modified aeration system uses the shorter aeration time usually 1.5 to 3 hours and a high food or sewage to microorganism concentration. The mixed liquor suspended solids concentration is relatively low, whereas, the organic loading is high. The resultant BOD removal in a modified aeration process is in the range of 60 to 70 percent; which is hardly adequate where high quality effluents are desired. Some difficulties have also been experiencced in the modified aeration process because of the poor settling characteristics of the sludge and the high suspended solids concentration in the effluent.

It has now been discovered that the BOD removal of the activated sludge processes can be upgraded to a 90% removal capability by installing fixed film contactors in the aeration tanks, with a minimal energy expenditure. Under the right conditions, nitrification will also proceed.

The rotating, biological contactor employed in the practice of the present invention preferably consists of a plurality of large diameter, corrugated plastic discs which are mounted on a horizontal shaft. As seen in FIG. 2 of the drawings in cross-section, the contactor 10 is positioned in the aeration tank 11 so that approximately 40 percent of the surface area of the plastic discs are submerged in the wastewater and it is provided with a plurality of pockets 12 disposed at the radially outermost surfaces 10a of the contactor assembly. The pockets 12 are constructed to be impinged upon by the hydraulic movement of the wastewater or to entrap the air being discharged below the surface of the wastewater to rotate the contactor assembly. The contactors disclosed in the Prosser U.S. Pat. No. 3,886,076 are particularly well suited for use in the present invention and the disclosure of that patent is incorporated by reference herein. However, other means of harnessing the fluid motion already present in the aeration tank to provide the force necessary to rotate the contactors may also be employed.

As seen in FIG. 2, the pockets 12 on the contactor may receive air under pressure from a supplemental air source 13 to impart a rotary movement to the contactor. Where it exists, the hydraulic motion of the tank contents resulting from the coarse bubble narrow band diffusion system 14 is usually adequate to rotate the contactor 10 and in most instances, will make the diversion of a portion of the compressed air to the supplemental air source unnecessary. The use of the existing hydraulic motion to rotate the contactor provides a significant advantage for it utilizes the existing energy in the tank to remove the BOD without additional cost. Diverting air to the pockets 12 through the supplemental air source 13 will maintain the necessary contactor rotation where an activated sludge system does not utilize hydraulic motion. Biological contactors are normally forcibly rotated which requires significant amounts of energy. By utilizing the existing hydraulic motion to rotate the rotating, biological contactor no additional energy expense is required.

As the contactor 10 slowly rotates with approximately 40% of the surface area submerged in the wastewater, organisms present naturally in the wastewater, as well as, those that have been introduced into the aeration tank with the activated sludge via the activated sludge return line begin to adhere to the rotating surfaces and multiply until the entire surface area of the contactor is covered with a layer of biomass approximately 1/20 to 1/8 inch thick.

In the preferred practice, the biomass from the surface of the disc appears very filamentous when examined under a microscope and contains approximately 50,000 to 100,000 mg/l suspended solids. The spectrum of organisms indicates a highly active and efficient biological mass. If the biomass was removed and placed in the mixed liquor, the resulting mixed liquor to suspended solids concentration would be 10,000 to 20,000 mg/l. The biomass provides a large active biological surface area much larger than the surface area of the media alone and achieves high degrees of treatment for relatively short retention times.

As the contactor 10 rotates, the media carries a film of wastewater into the air where it trickles down the surface and absorbs oxygen from the air. Organisms in the biomass then remove both dissolved oxygen and organic materials from this film of wastewater. Further removal of dissolved and colloidal organic materials occurs as the media continues rotation through the bulk of wastewater in the tank. The unused dissolved oxygen is mixed with the contents of the mixed liquor maintaining a mixed liquor dissolved oxygen concentration. Concurrently, organic materials are being adsorbed and oxidized with the flocculated biomass of the conventional activated sludge system.

Due to the efficient biological activity in the preferred practice, the resulting sludge production quantities are less than those obtained from a single, wastewater treatment process of similar rating. As a result, the difficulty and costs in disposing of this treatment by-product are accordingly reduced.

As previously mentioned the compressed air being diffused near or at the bottom of the aeration tanks sets up a hydraulic motion of the tank contents, in addition to supplying oxygen to the suspended culture for respiration. The direction of the rotation of the contactors is contingent upon its placement in the aeration tank. As shown in FIG. 2, the submerged portion of the contactor should rotate with horizontal hydraulic velocity vector. If desired, the rotating motion may be assisted or accomplished by diverting a small fraction of the compressed air through the supplemental air source 13. It can be shown that for the same amount of energy used to effect 60–80% carbonaceous removal efficiencies with the conventional or modified aeration process, a treatment plant can achieve in excess of 90% removal rates when the contactors are placed in the aeration tanks as described herein. Oxidation of nitrogenous compounds will also proceed when the carbonaceous removals are in this range.

The performance of the method of the present invention can be estimated by assuming:

1. At any point in the aeration tank, both the aeration and the rotating (RBC) system will behave as if the other was not there.
2. Each system (and the combination of systems) will remove $BOD_5$ according to first order kinetics.

In the absence of an aeration system, the RBC will perform such that:

$$C/Co = e^{-k_1 t}$$

where,
$C_o$ = initial $BOD_5$ concentration ($t=0$)
$C$ = $BOD_5$ concentration at any time, $t$
$k_1$ = RBC removal constant
$t$ = retention time and in the absence of the RBC, the aeration system will perform such that:

$$C/Co = e^{-k_2 t}$$

where, $k_2$ = aeration removal constant.

Therefore, the whole system will perform (assuming RBC units across entire length of pass):

$$C/Co = e^{-(k_1 t + k_2 t)} \qquad \text{Eq. 1}$$

Noting that:

$$k_1 = \ln(1-P_1)/t \qquad \text{Eq. 2}a$$

and $$k_2 = \ln(1-P_2)/t \qquad \text{Eq. 2}b$$

where
$P_1$ = fraction $BOD_5$ removal in RBC only system, in $t$
$P_2$ = fraction $BOD_5$ removal in aeration only system, in $t$ combining equations 1, 2a and 2b:

$$C/Co = (1-P_2).$$

Figure 3:
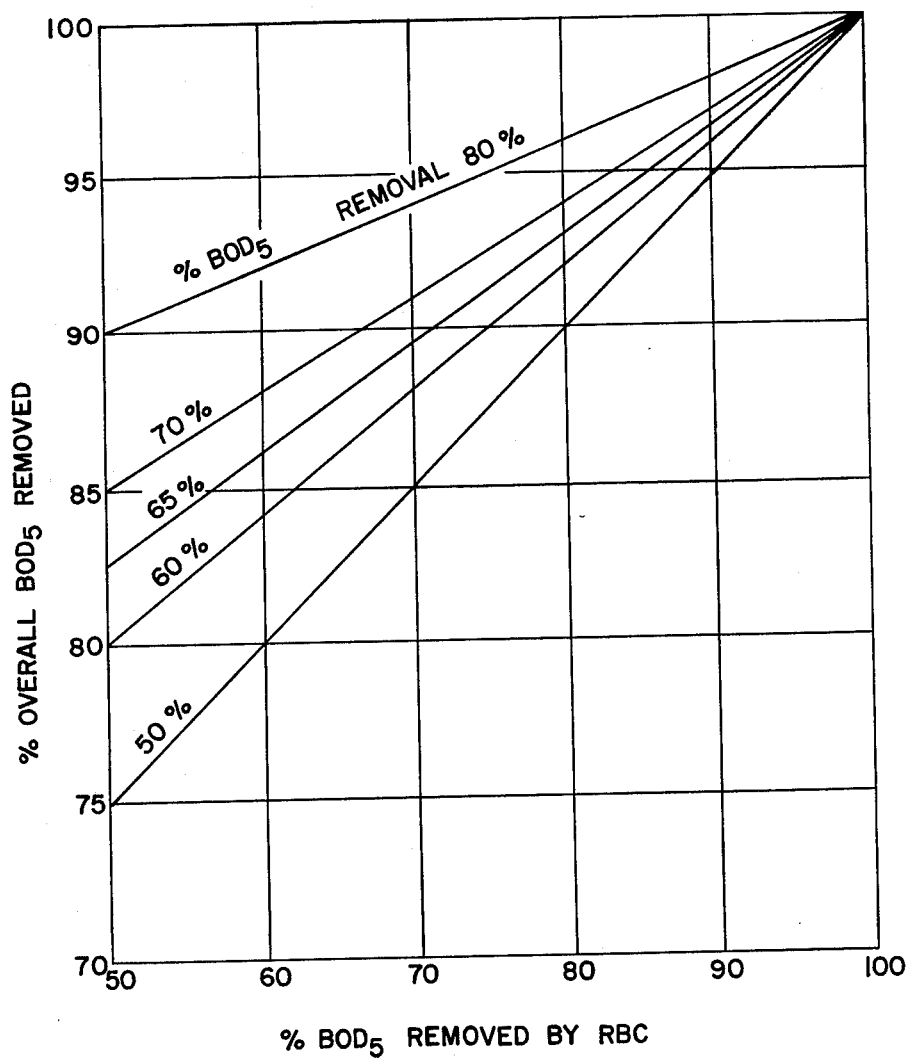
FIG. 3 is a chart indicating the percent of $BOD_5$ removal by the practice of the invention.

This is plotted on FIG. 3 in terms of percent $BOD_5$ removals. The data plotted on FIG. 3 is based on the assumption that by combining the known aerator performance with expected RBC performance, the expected degree of $BOD_5$ removal across the system can be estimated. These estimates should be considered as conservative performance projections.

The activated sludge process and the fixed film rotating contactors operate in a similar manner in that they both can independently achieve high quality wastewater effluents. However, the rotating, biological contactor has a resident biomass on the contactor which provides additional advantages.

The application of the present invention to the activated sludge treatment plant can result in increased process stability for such a plant. The activated sludge process normally depends on sludge recycling for satisfactory operation. As a result a hydraulic surge can cause the loss of the activated sludge from the secondary clarifier and upset the process efficiency by eliminating the activated sludge which is required to supply biomass to the aeration tanks. In addition, organic slugs can develop which will cause a loss of sludge through sludge bulking. The method of the present invention is not upset by such events since a large population of biological solids is always maintained on the rotating contactor to provide an inoculant of biologically active material for the aeration tank.

The method of the present invention also provides a convenient method of reducing the concentration of nitrogenous materials in sewage effluent. The activated sludge process usually requires a two-stage process be constructed with separate aeration, settling and sludge recycling systems to promote nitrification. However, with the present invention a single system of tanks can be used to oxidize both carbonaceous and nitrogenous oxygen demanding materials.

In the preferred practice of the invention the rotating contactors and principally rotated by the hydraulic or fluid movement which exists within the normal aeration tank; however, if desired, in addition to harnessing the natural hydraulic energy of the tank, supplemental air or mechanical drive devices can be used to rotate the contactors at the desired speed.

Beyond the oxidization of organics aeration tanks are also used for other wastewater treatment processes such as recycle sludge reaeration and aerobic digestion. The preferred practice can be utilized in the former case to improve sludge reactivation improving treatment plant performance; and in the latter, to further oxidize sludge to reduce the quantities for ultimate disposal.

In comparing the conomics of the preferred practice to alternate means of wastewater treatment, it can be shown that the cost to build and to operate the preferred apparatus is less. In addition, the differences in annual costs become even greater when (a) consideration is given to the rising cost of energy, (b) capital recovery costs become greater as the interest rate of municipal bond issues rise, and (c) the amount of urban land available to a municipality for treatment plant expansion is minimized.

It will be apparent to those skilled in the art, that although a specific embodiment of the invention has been described, the scope of the invention is intended to cover all variations of percent of submergence, speed and position to flow, of any rotating body.

In view of the possible modifications, the invention is not intended to be limited by the showing or description herein, or in any other manner, except insofar as may specifically be required.

I claim:

1. The method of improving the efficiency of an activated sludge wastewater treatment plant and of protecting it from destructive hydraulic surges which comprises:
    (a) forceably aerating wastewater in an aeration tank,
    (b) partially submerging a rotatable biological contactor in the aeration tank,
    (c) recycling activated sludge to said aeration tank, and
    (d) rotating said contactor to promote and support the growth upon said contactor of a filamentous, highly active and efficient biomass which includes as part of the biomass the living organisms normally present in activated sludge as well as those typically present on the surfaces of a rotatable biological contactor.

2. The method of claim 1 in which the contactor is rotated by the hydraulic motion of the wastewater on said aeration tank.

* * * * *

UNITED STATES PATENT OFFICE
CERTIFICATE OF CORRECTION

Patent No. 4,093,539         Dated June 6, 1978

Inventor(s)  Carmen F. Guarino

It is certified that error appears in the above-identified patent and that said Letters Patent are hereby corrected as shown below:

Column 1, line 13    "contacter" should be -- contactor --
Column 2, line 4     "employes" should be -- employs --
Column 2, line 34    "and" should be -- are --
Column 3, line 6     "watewater" should be -- wastewater
Column 3, line 20    "object" should be -- objects --
Column 5, line 55    comma after "single" should be deleted
Column 6, line 46    Equation: "$C/Co = (1-P_2)$" should be -- $C/Co = (1-P_1)(1-P_2)$ --

Column 7, line 18    "and" should be -- are --
Column 7, line 33    "conomics" should be -- economics --
Column 8, line 4     "of" should be -- on --

Signed and Sealed this

Thirteenth Day of February 1979

[SEAL]

Attest:

RUTH C. MASON
*Attesting Officer*

DONALD W. BANNER
*Commissioner of Patents and Trademarks*